United States Patent
Onoe et al.

[11] Patent Number: 6,163,397
[45] Date of Patent: Dec. 19, 2000

[54] WAVELENGTH CONVERTING DEVICE AND METHOD OF FABRICATING WAVELENGTH CONVERTING DEVICE

[75] Inventors: Atsushi Onoe; Ayako Yoshida; Kiyofumi Chikuma, all of Tsurugashima, Japan

[73] Assignee: Pioneer Electronic Corporation, Tokyo-to, Japan

[21] Appl. No.: 09/271,914

[22] Filed: Mar. 18, 1999

[30] Foreign Application Priority Data

Mar. 20, 1998 [JP] Japan .................................. 10-092398

[51] Int. Cl.$^7$ ..................................................... G02F 1/365
[52] U.S. Cl. .......................... 359/332; 385/122; 385/141
[58] Field of Search ............................ 385/122, 129–132, 385/141, 142; 359/326, 328, 329, 330, 332

[56] References Cited

U.S. PATENT DOCUMENTS 5,581,396  12/1996  Kubota et al. ........................ 359/332

FOREIGN PATENT DOCUMENTS 6-67235  3/1994  Japan .

*Primary Examiner*—John D. Lee
*Attorney, Agent, or Firm*—Young & Thompson

[57] ABSTRACT

A wavelength converting device for converting a wavelength of a light is provided. The wavelength converting device includes: a substrate comprising MgO; a waveguide membrane comprising $KNbO_3$, for guiding the light; a buffer membrane which is disposed between the substrate and the waveguide membrane and which comprises $KTa_xNb_{(1-x)}O_3$. A mixing rate of Ta in the $KTa_xNb_{(1-x)}O_3$ in the buffer membrane is in a range of 40 atom % to 60 atom % at a surface of the buffer membrane touching the substrate, and is 0 atom % at a surface of the buffer membrane touching the waveguide membrane.

8 Claims, 7 Drawing Sheets

KNbO₃(001)

FIG. 4B

MgO(110)

WAVELENGTH CONVERTING DEVICE AND METHOD OF FABRICATING WAVELENGTH CONVERTING DEVICE

BACKGROUND OF THE INVENTION

1. Field of the Invention

The present invention relates generally to a wavelength converting device for obtaining, for example, a second order harmonic by converting the wavelength of a light beam such as a laser, and more specifically to a wavelength converting device having a substrate composed of MgO and a waveguide formed of a $KNbO_3$ membrane and a method of fabricating the wavelength converting device.

2. Description of the Related Art

A wavelength converting device has a function of radiating a second order harmonic of a laser. This is preferably utilized for obtaining a laser having a shorter wavelength. A typical wavelength converting device has: a substrate composed of MgO; a waveguide formed of a $KNbO_3$ membrane, which is formed on the substrate by crystal growth; an electrode member formed on the surface of the $KNbO_3$ membrane; and a stripe-shaped $TiO_2$ membrane which is used to shut the light therein and which is formed on the surface of the $KNbO_3$ membrane. The $KNbO_3$ membrane has characteristics that a non-linear optical constant is large and that a light damage resistance is high. Therefore, this type of the wave converting device enables high efficient wavelength conversion and has a long life.

However, this type of wave converting device has a problem that deformation occurs in the $KNbO_3$ membrane because the lattice constant of the $KNbO_3$ membrane is mismatched with that of the MgO. This causes a loss to propagation of a light.

Meanwhile, the $KNbO_3$ membrane is formed on the MgO substrate by inducing crystal growth in fabrication of this wavelength conversion device. In the fabrication process, not only a crystal plane having a necessary crystal orientation ((001) plane) but also a crystal plane having an unnecessary crystal orientation (for example, (011) plane) is grown. As a result, efficiency of the wavelength conversion is undesirably reduced.

SUMMARY OF THE INVENTION

An object of the present invention is to provide a wavelength converting device having a MgO substrate and a waveguide formed of $KNbO_3$ membrane and a method of fabricating the wavelength converting device, which can reduce deformation in the $KNbO_3$ membrane and achieve an optimum wavelength conversion.

According to the present invention, a wavelength converting device including a substrate comprising MgO; a waveguide membrane comprising $KNbO_3$, for guiding the light; a buffer membrane which is disposed between the substrate and the waveguide membrane and which comprises $KTa_xNb_{(1-x)}O_3$, wherein a mixing rate of Ta in the $KTa_xNb_{(1-x)}O_3$ in the buffer membrane is in a range of 40 atom % to 60 atom % at a surface of the buffer membrane touching the substrate 1, and is 0 atom % at a surface of the buffer membrane touching the waveguide membrane.

In this wavelength converting device, the buffer membrane is located between the substrate and the waveguide membrane, and a mixing rate of Ta in the $KTa_xNb_{(1-x)}O_3$ in the buffer membrane is in the range of 40 atom % to 60 atom % at a surface of the buffer membrane touching the substrate 1, and is 0 atom % at a surface of the buffer membrane touching the waveguide membrane. Therefore, a mismatch of the lattice constants between the substrate and the waveguide membrane can be eased. Therefore, the influence of the mismatch of the lattice constants between the substrate and the waveguide membrane on the waveguide membrane can be reduced, thereby reducing the deformation in the waveguide membrane. In addition to this advantage, according to the present invention, the waveguide membrane including crystal planes having a good wavelength converting function can be provided.

The present invention also provides a method of fabricating this wavelength converting device. The method including the processes of: preparing the substrate; forming the buffer membrane on the substrate by inducing crystal growth; and forming the waveguide membrane on the formed buffer membrane by inducing crystal growth.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be described. In the description set forth hereinafter, the present invention is applied to a channel type wavelength converting device. The channel type wavelength converting device is a device for obtaining a second order harmonic by converting the wavelength of an incident laser light.

Figure 1:
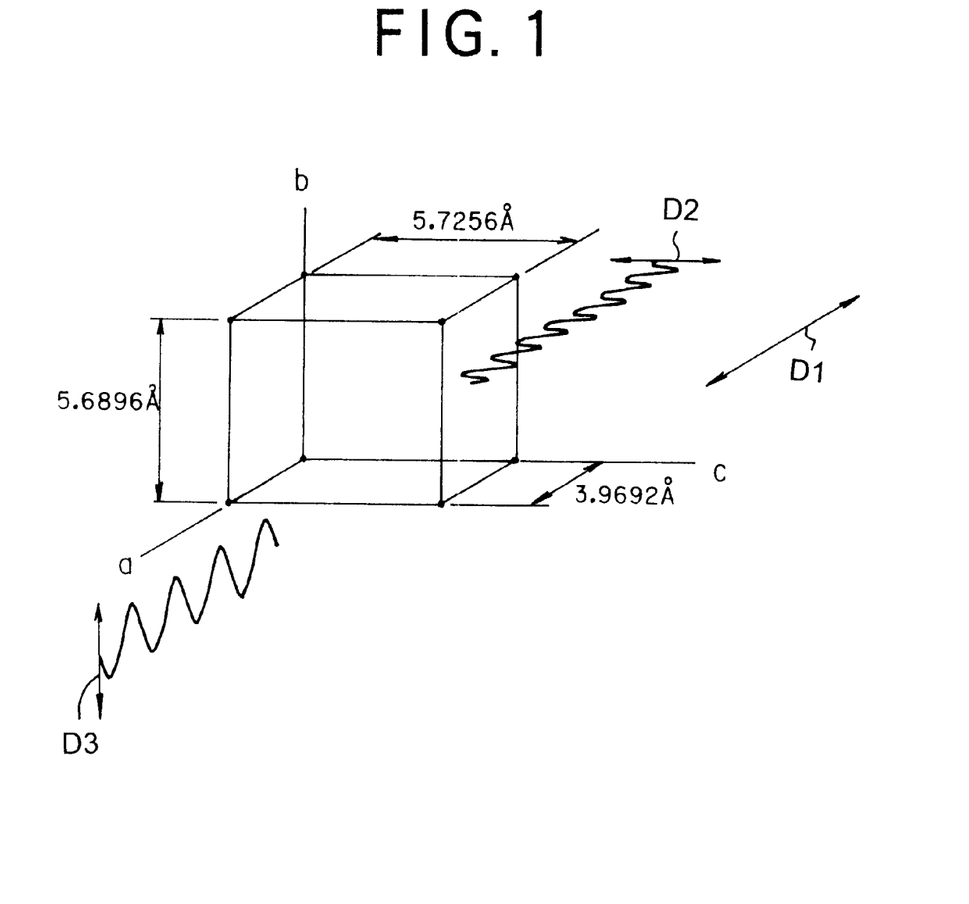
FIG. 1 shows a crystal structure of a KN membrane, a fundamental wave and a second order harmonic of an embodiment of the present invention

Referring first to FIG. 1, a $KNbO_3$ membrane will be described. The $KNbO_3$ membrane (It is referred to as a "KN membrane", hereinafter.) serves as a waveguide membrane for converting the wavelength of an incident laser light by using its optical nonlinear characteristics.

The KN membrane is a ferroelectric substance having high resistance against a light damage, whereas it has a crystal structure of a rhombic or orthorhombic system and a rectangular parallelopiped lattice. As shown in FIG. 1, the lattice constants thereof are a=3.962 angstrom, b=5.6896 angstrom, and c=5.7256 angstrom.

A relationship between the polarization of rhombic system, the nonlinear susceptibility tensor, and the field is shown in an expression (1).

$$\begin{pmatrix} Pa \\ Pb \\ Pc \end{pmatrix} = \varepsilon_0 \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix} \begin{pmatrix} Ea^2 \\ Eb^2 \\ Ec^2 \\ 2\,Eb\,Ec \\ 2\,Ec\,Ea \\ 2\,Ea\,Ec \end{pmatrix} \quad (1)$$

where "P" denotes a polarization component, "d" denotes a second order nonlinear optical constant, "E" denotes a fundamental wave field component, "a", "b" and "c" denote axises in FIG. 1, respectively, and $\epsilon_0$" denotes the dielectric constant in vacuum.

In order to form the KN membrane by the epitaxial growth and use it as the waveguide of the wavelength converting device, the (001) plane, i.e., (a–b) plane in FIG. 1 of the KN membrane is grown, and therefore the nonlinear optical constant $d_{32}$, which is relatively large constant among all the nonlinear optical constant, is used. In this case, as shown in FIG. 1, the second order harmonic that is transmitted in the direction of the a-axis (in the direction D1) and that vibrates in the a–c plane (in the direction D2) is obtained from the fundamental wave that is transmitted in the direction of the a-axis (in the direction D1) and that vibrates in the a–b plane (in the direction D3).

If it is assumed that the wavelength of the fundamental wave is 1.06 μm, the nonlinear optical constants of the KN membrane is shown below.

$d_{33}$=−27.4±0.3 pm/V $d_{32}$=−18.3±0.3 pm/V $d_{32}$=−20.5±0.3 pm/V (λ=860 nm)

$d_{31}$=−15.8±0.3 pm/V $d_{24}$=17.1±0.4 pm/V $d_{16}$=16.5±0.4 pm/V $d_{15}$=16.5±0.4 pm/V

Figure 2:
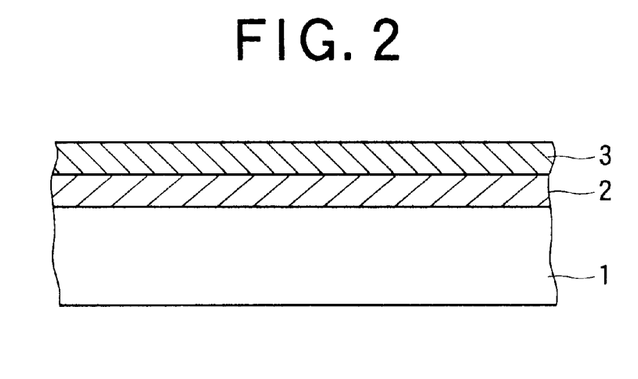
FIG. 2 is a sectional view of a part of a wavelength converting device of the embodiment of the present invention.
Figure 3:
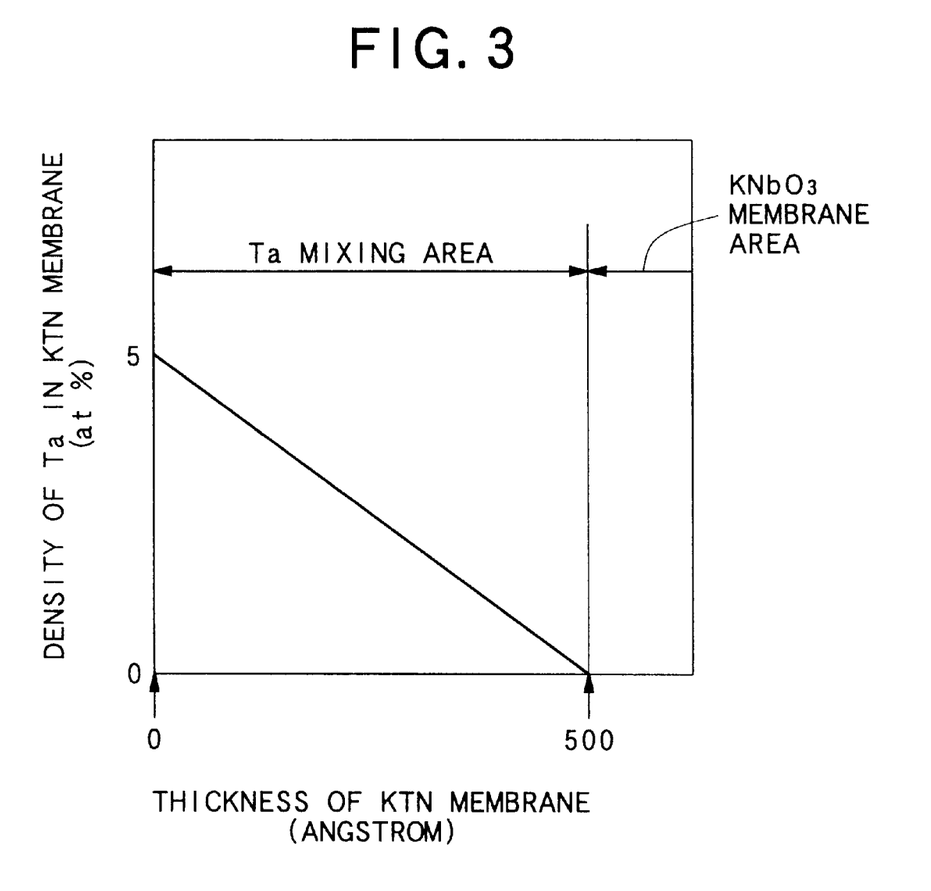
FIG. 3 shows a relationship between a thickness of a KTN membrane and density of Ta in the KTN membrane according to the embodiment of the present invention.

Referring to FIGS. 2 and 3, the configuration of the substrate and the KN membrane of the wavelength converting device will be described.

In the wavelength converting device of the embodiment of the present invention, as shown in FIG. 2, a $KTa_xNb_{(1-x)}O_3$ membrane 2 (It is referred as a "KTN membrane", hereinafter.) serving as a buffer membrane and a KN membrane 3 serving as a waveguide are formed on a substrate 1. The thickness of the KTN membrane 2 is within the range of 300 to 500 angstrom, and particularly approximately 500 angstrom. The KN membrane 3 is approximately 9000 angstrom in thickness. The KTN membrane 2 is located between the substrate 1 and the KN membrane 3. Both membranes 2 and 3 are formed on the substrate 1 by inducing crystal growth by MOCVD (Metal Organic Chemical Vapor Deposition) method. The substrate 1 is composed of MgO(110).

As for the KTN membrane 2, as shown in FIG. 3, the mixing ratio X of tantalum (Ta) in the KTN membrane 2 is 50 atom % at the surface touching the substrate 1 and is 0 atom % at the surface touching the KN membrane 3, and it gradually decreases between the surface touching the substrate 1 and the surface touching the KN membrane 3 in the direction from substrate 1 to the KN membrane 3.

Figure 4A:
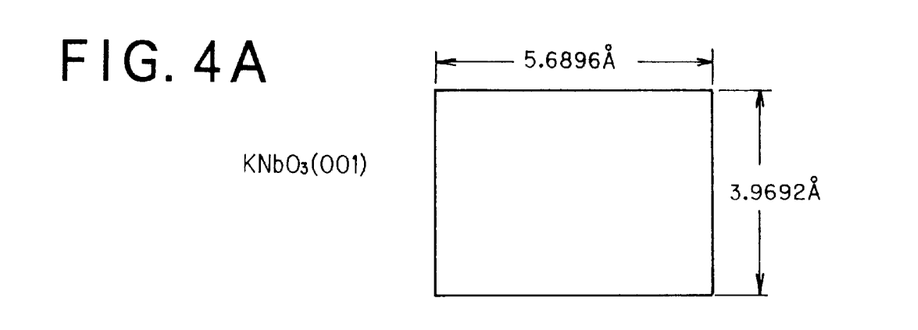
FIG. 4 shows a (001) plane of $KNbO_3$ of the KN membrane of the wavelength converting device.
Figure 4B:
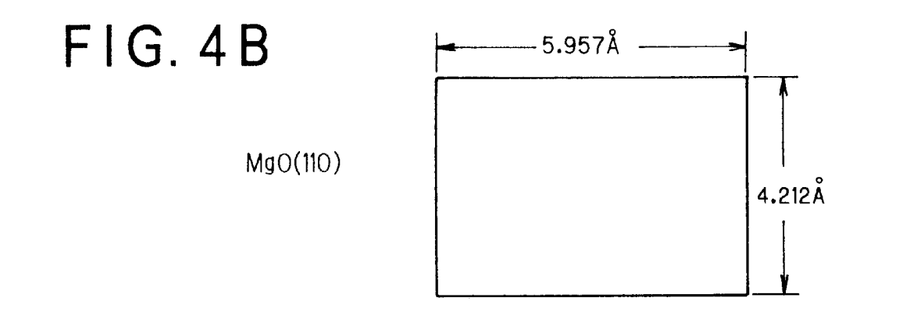
FIG. 4B shows a (110) plane of MgO of the substrate of the wavelength converting device.

FIG. 4A shows the (001) plane of the KN membrane 3. FIG. 4A shows the (110) plane of the substrate 1. As shown in FIGS. 4A and 4B, the lattice constants of the (001) plane of the KN membrane 3 are different from the lattice constants of the (110) plane of the substrate 1. Therefore, if it is assumed that the KN membrane 3 are directly formed on the substrate 1, the lattice constants of the KN membrane 3 are mismatched with those of the substrate 1. However, according to the embodiment of the present invention, the KTN membrane 2 is sandwiched between the substrate 1 and the KN membrane 3. In addition to this, the mixing rate of tantalum (Ta) in the KTN membrane 2 is 50 atom % at the surface on the side of the substrate 1, and then gradually decreases, and finally reaches 0 atom % at the surface on the side of the KN membrane 3. Therefore, the mismatch of the lattice constants between the substrate 1 and the KN membrane 3 is gradually eased in the direction from the substrate 1 to the KN membrane 3, so that the influence of this mismatch on the KN membrane 3 is reduced. Hence, the deformation in the KN membrane 3 can be extremely reduced, as compared with the case where the KN membrane 3 is directly grown on the substrate 1.

Figure 5:
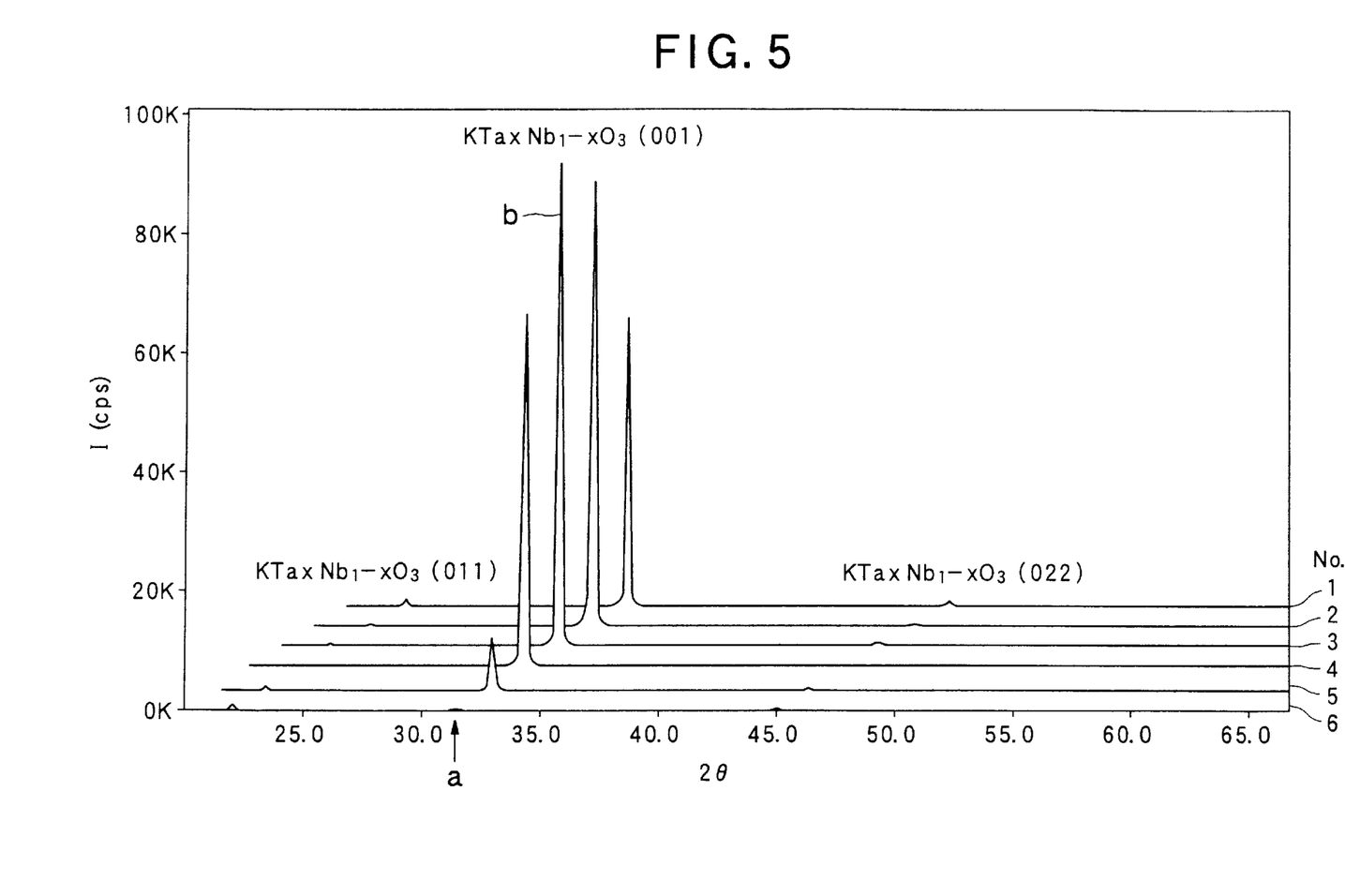
FIG. 5 shows a relationship between a mixing rate of Ta in the KTN membrane and a condition of crystal orientations.

FIG. 5 a graph showing results of X-ray analysis of crystal. Referring to this graph and a chart shown below, a relationship between the mixing rate of Ta in the KTN membrane and a condition of crystal orientations will be described.

| No. | Compositions Ratio of Material Gas | |
| --- | --- | --- |
|  | Nb | Ta |
| 1 | 0 | 10 |
| 2 | 4 | 6 |
| 3 | 5 | 5 |
| 4 | 6 | 4 |
| 5 | 8 | 2 |
| 6 | 10 | 0 |

As shown in this chart, the KTN membrane is grown on the MgO substrate by vapor phase epitaxy process six times, while changing the mixing rate of the Ta, and the X-ray analysis is done with respect to each KTN membrane. The results of this X-ray analysis are shown in FIG. 5.

In FIG. 5, if the membrane in which Ta is not contained at all is grown on the MgO substrate (This means that the KN membrane is directly formed on the MgO substrate.), not only the (001) plane necessary for the wavelength conversion (shown by an arrow a) but also a (011) plane and (022) plane are grown (No. 6 in FIG. 5).

In contrast, in the case of the membrane containing Ta of 50 atom % (No. 3 in FIG. 5), the (001) plane is actively grown, as shown by an arrow b in FIG. 5. This means that the (001) plane can be actively grown in the KN membrane if the KN membrane is formed on the KTN membrane containing Ta of 50 atom %.

Now, it should be noted that the mixing rate of the Ta in the KTN membrane 2 is 50 atom % at the surface on the side of the substrate 1 and is 0 atom % at the surface on the side of the KN membrane 3, and further, this mixing rate is gradually decrease from the side of the substrate 1 to the side of the KN membrane 3. As a result, as for the boundary between the KTN membrane 2 and the KN membrane 3, the compositions of both membranes are continuous. That is, the KN membrane 3 are continuously laminated on the KTN membrane 2 with respect to their compositions. The (001) plane is very actively grown in the KN membrane 3 by the harmonization between the effect that the boundary of the membranes 2 and 3 is continuous and the effect that the (001) plane is actively grown in the KTN membrane 2 containing Ta of 50 atom %.

In addition, the mixing rate of tantalum (Ta) in the KTN membrane 2 at the surface on the side of the substrate 1 (i.e., the maximum mixing rate of tantalum (Ta)) is not limited to 50 atom %. It will be appreciated that the mixing rate is within the range of 40 to 60 atom %. If it is within this range, a great number of the (001) planes may be included in the KN membrane 3 laminated on the KTN membrane 2.

Referring to FIGS. 6A through 6E, a fabricating process of the wavelength converting device of the embodiment of the present invention will be described. FIGS. 6A through 6E are sectional views showing the processes of fabricating the wavelength converting device.

Figure 6A:
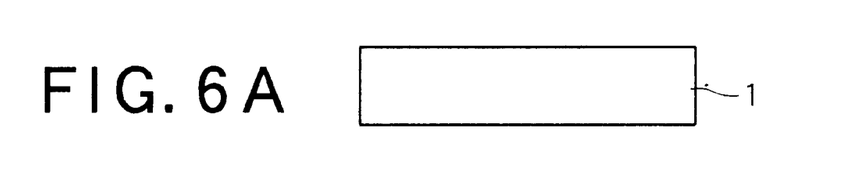
FIGS. 6A through 6E show processes of fabricating the wavelength converting device of the embodiment of the present invention.
Figure 6B:
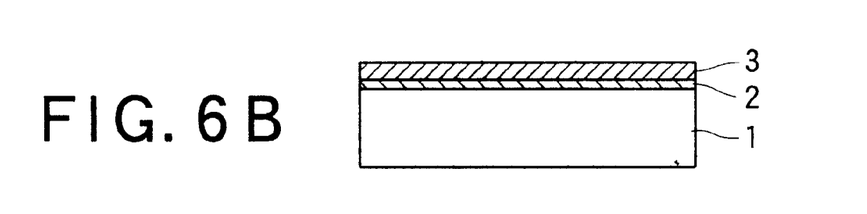

As show in FIG. 6A, the substrate 1 having a MgO(110) plane is prepared. Next, KTN membrane 2 and the KN membrane 3, as shown in FIG. 6B, are formed on the MgO(110) plane of the substrate 1 by using the MOCVD method.

The KTN membrane 2 is formed by using an oxide CVD apparatus under the following conditions. The temperature is approximately 850° C., and the pressure is approximately 5 Torr (reactor pressure). Potassium dipivaloylmethanate (or potassium 2,2,6,6-tetramethyl-3,5-heptnedionate: $K(C_{11}H_{19}O_2)$); pentaethoxyniobium $Nb(OC_2H_5)_5$; and pentaethoxytantalum $Ta(OC_2H_5)_5$ are used as material gas. In addition, $K(C_{11}H_{19}O_2)$ is referred to as "K(DPM)".

The KN membrane 3 is formed by using an oxide CVD apparatus under the following conditions. The temperature is 850° C., The pressure is 5 Torr (reactor pressure). K(DPM) and pentaethoxyniobium $Nb(OC_2H_5)_5$ are used as material gas.

The processes of forming the KTN membrane 2 and the KN membrane 3 will be described in detail. Firstly, the substrate 1 having MgO(110) plane is set in the reaction chamber of the oxide CVD apparatus. Next, the temperature of the substrate 1 is increased to the predetermined temperature, about 850° C. and the pressure in the reaction chamber is decreased to the predetermined pressure, about 5 Torr. Next, the aforementioned primary materials are supplied to the carburetor of the oxide CVD apparatus. Next, these materials are sublimated or vaporized by maintaining the predetermined temperature, thereby producing organometallic gas. Next, this organometallic gas is sent as laminar flow to the reaction chamber in which the heated substrate 1 is set, by using Ar carrier gas and oxide gas $O_2$ whose flow rates are controlled. As a result, epitaxial membranes are deposited on the substrate 1.

In these processes, while the KTN membrane 2 is deposited, the quantity of flow of pentaethoxytantalum $Ta(OC_2H_5)_5$ is gradually decreased from when the deposition of the KTN membrane 2 is started until when the deposition of the KTN membrane 2 is ended, in such a way that the quantity of flow of the pentaethoxytantalum $Ta(OC_2H_5)_5$ becomes zero when the deposition of the KTN membrane 2 has been just ended. As a result, the mixing rate of the tantalum (Ta) in the KTN membrane 2 is continuously and monotonously decreased in the direction from the substrate 1 to the KN membrane 3, as shown in FIG. 3.

In addition, by controlling the quantity of flow of pentaethoxytantalum $Ta(OC_2H_5)_5$, the mixing rate of Ta may be decreased in such a way that the decrease of the amount of Ta draws a curve line.

Moreover, the oxide materials are created from the primary materials by oxide reactions. Therefore, it is preferable that a certain amount of oxygen is added to the reaction gas.

Figure 6C:
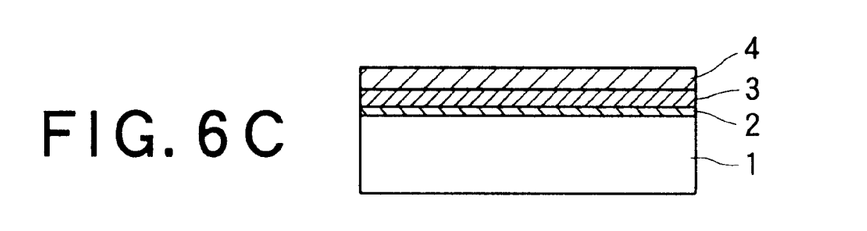

After forming the KTN membrane 2 and the KN membrane 3, a $TiO_2$ membrane 4 is formed on the KN membrane 3 by a sputtering method or vacuum deposition method, as shown in FIG. 6C.

The $TiO_2$ membrane 4 is a dielectric membrane having a higher refractive index than that of air in order to form a three dimensions waveguide. To meet a cutoff requirement to shut the laser light into the KN membrane 3, the $TiO_2$ membrane 4 is, for example, about 800 angstrom in thickness (in the case where the KN membrane 3 is used as a single mode waveguide). If the thickness of the $TiO_2$ membrane 4 is thick, the laser light is propagated though the $TiO_2$ membrane 4 because the $TiO_2$ membrane 4 has the higher refractive index than that of the KN membrane 3. From this point of view, the thickness of the $TiO_2$ membrane 4 is set so as to shut the laser light into the KN membrane 3.

In addition, instead of the $TiO_2$ membrane 4, a $SiO_2$ membrane may be used as a membrane to shut the light into the KN membrane 3. However, in this case, it is needed to set the thickness of the $SiO_2$ membrane 4 at about 2 to 3 $\mu$m for the above-mentioned reason.

Figure 6D:
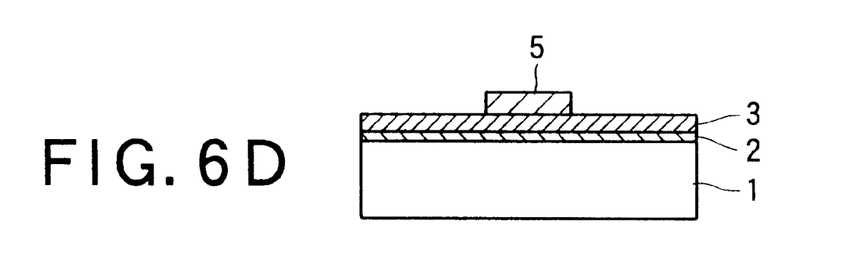

After forming the $TiO_2$ membrane 4, a patterning process is treated with the $TiO_2$ membrane 4, thereby forming a shutting layer 5, as shown in FIG. 6D. The shutting layer 5 is in the form of stripe extending along the transmitting direction of the laser light. In the patterning process, a photolithography technique, for example, an RIE (Reactive Ion Etching) method is used.

Figure 6E:
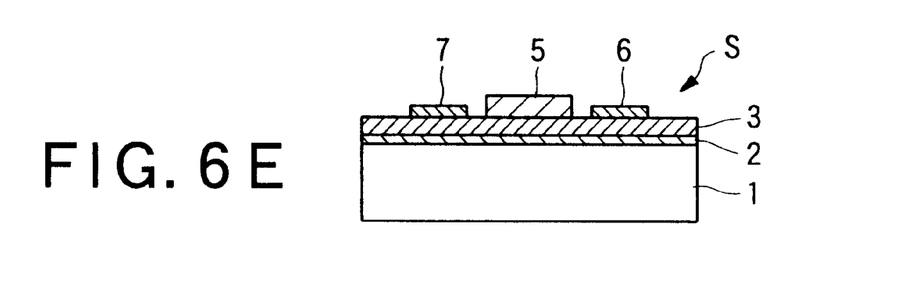

Next, as shown in FIG. 6E, a couple of electrodes 6 and 7 are formed on the area in the surface of the KN membrane 3 where the $TiO_2$ membrane 4 is removed. Each of the electrodes 6 and 7 is in the form of stripe and positioned parallel to the shutting layer 5. The electrodes 6 and 7 are devices to carried out the phase matching between the fundamental wave of the laser light and its second order harmonic. In such processes, the wavelength converting device S is fabricated.

In addition, aluminium, aluminium alloy, gold, or platinum may be used as a material of the electrodes 6 and 7. In consideration of applying a high electric field to the electrodes 6 and 7 when the wavelength converting device is actually driven, it is preferable to use gold or platinum as the material of the electrodes 6 and 7.

In addition to these processes, a diffraction grating 8 (FIG. 8) intended for a control of the incident light may be formed on the surface of the shutting layer 5.

Figure 7A:
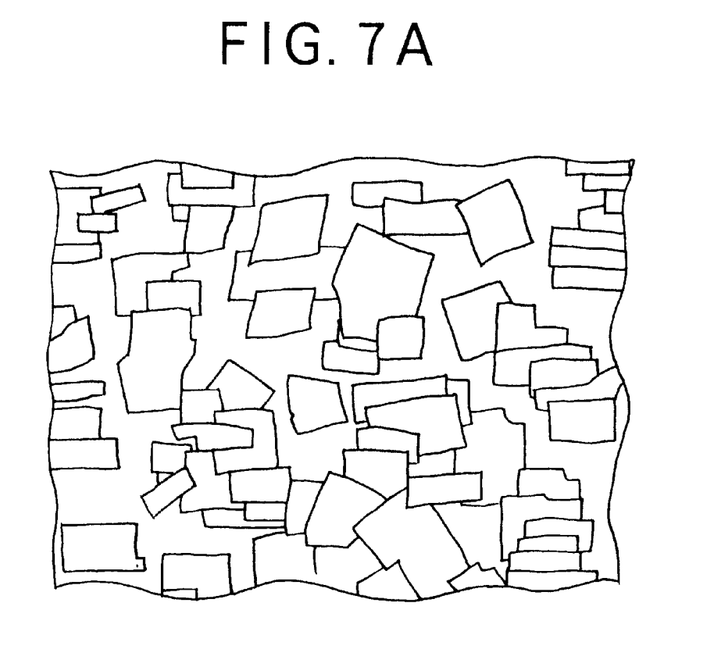
FIGS. 7A and 7B show a surface of the KN membrane.
Figure 7B:
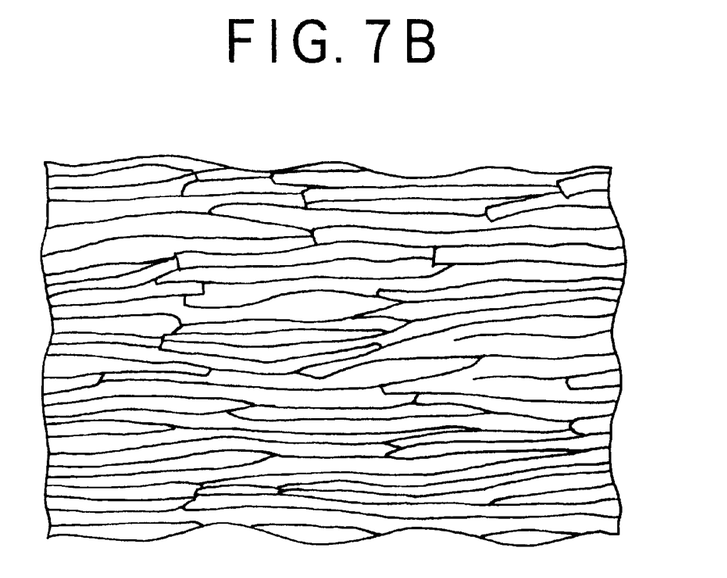

FIG. 7A shows a condition of the surface of the KN membrane in the case where the KN membrane is directly formed on the substrate without the KTN membrane. FIG. 7B shows a condition of the surface of the KN membrane 3 in the case where the KN membrane 3 is formed on the KTN membrane 2.

As seen from FIGS. 7A and 7B, the surface of the KN membrane 3 formed on the KTN membrane 2 is finer and smoother than the surface of the KN membrane formed directly on the substrate. In consideration of such a difference of the conditions of the surfaces and the result of the X-ray analysis shown in FIG. 5, the KTN membrane 2 makes it easy to grow the KN membrane 3 that main surface is (001) plane.

Figure 8:
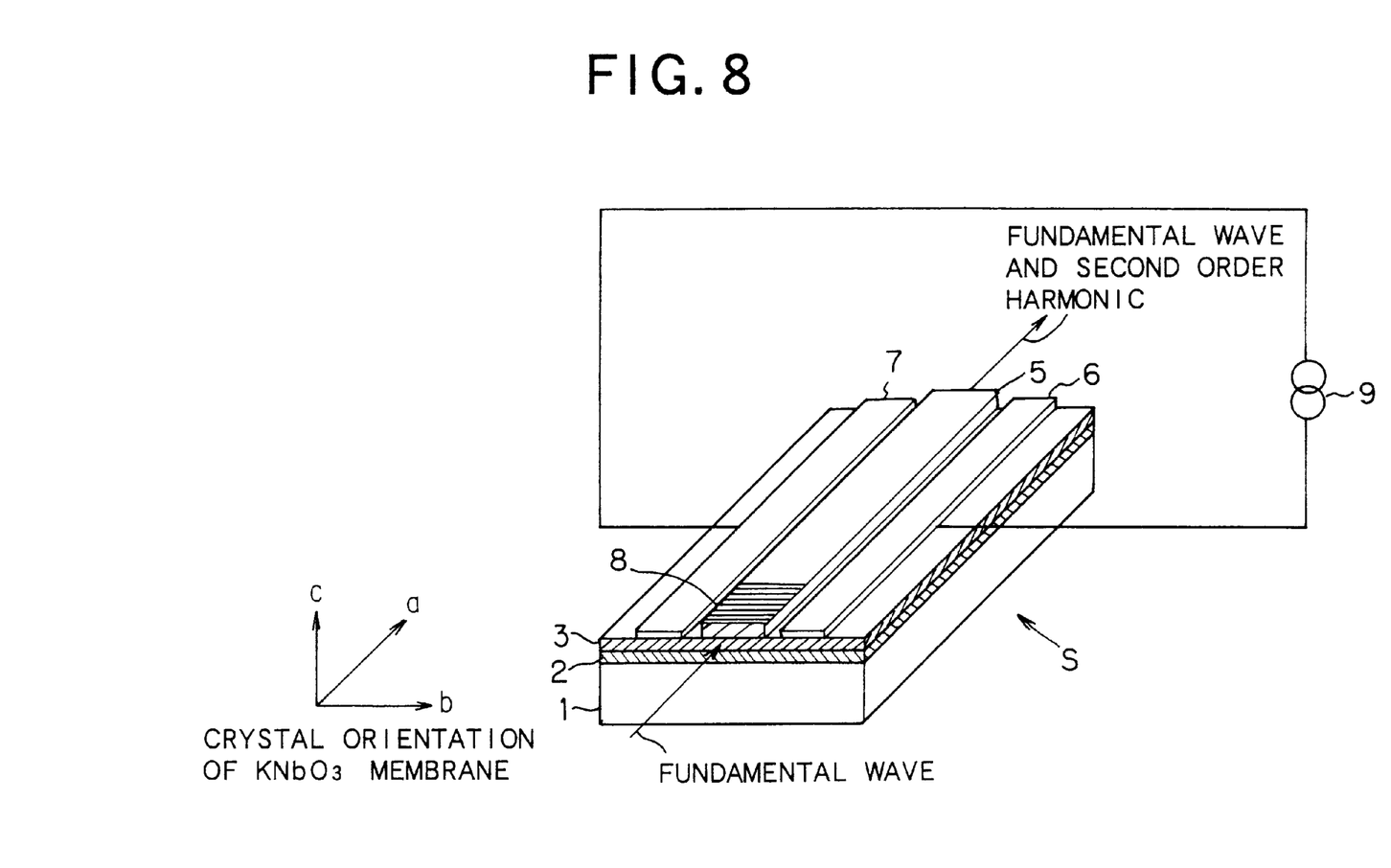
FIG. 8 shows the wavelength converting device of the embodiment of the present invention.

Referring to FIG. 8, an operation of the wavelength converting device S will be described. When the wavelength converting device S is operated, voltages are applied to the respective electrodes 6 and 7 from a power source 9 to apply an electric field between the electrodes 6 and 7. Next, the first order electric optical effect is obtained by the applied electric field, and the execution refractive index of the fundamental wave and the execution refractive index of the second order harmonic are controlled so as to match between both waves. Thus, the second order harmonic is obtained. The fundamental wave is entered at one end of the shutting layer 5, and the second order harmonic and the fundamental wave leave at the other end.

The wavelength converting experiment on the wavelength converting device S having the KN membrane 3 with the thickness of 9000 angstrom, the KTN membrane 2 with the thickness of 500 angstrom, the shutting membrane 5 with the thickness of 800 angstrom, and the diffraction grating 8 which is located at the vicinity of the entrance of the fundamental wave, is done in a room temperature. In this experiment, the fundamental wave with the wavelength of 860 nm is entered. As a result, the good light shutting effect is obtained, and the second order harmonic with the wavelength of 430 nm is obtained in high conversion efficiency.

Furthermore, the stable output at the high level is obtained because of the high light damage resistance of the KN membrane 3.

As can be understood from the above, the wavelength converting device S of the embodiment of the present invention has the KTN membrane 2 between the substrate 1 and the KN membrane 3, and the mixing rate X of tantalum Ta in the KTN membrane 2 is 50 atom % at the surface on the side of the substrate 1, and is 0 atom % at the surface on the side of the KN membrane 3. Therefore, the influence of the mismatch of the lattice constants between the substrate 1 and the KN membrane 3 on the KN membrane 3 can be eased, so that the deformation in the KN membrane 3 can be reduced. Accordingly, high efficient wavelength conversion can be achieved.

Moreover, as described above, the mixing rate X of tantalum Ta in the KTN membrane 2 is gradually decreased between the surface on the side of the substrate 1 and the opposite surface. Therefore, the influence of the mismatch of the lattice constants between the substrate 1 and the KN membrane 3 on the KN membrane 3 can be sufficiently eased.

Moreover, since the KN membrane 3 has the (001) plane in the $KNbO_3$ crystal as its main surface, the wavelength conversion using a large nonlinear optical constant of the $KNbO_3$ crystal can be achieved.

Moreover, the KTN membrane 2 is thin, namely, 500 angstrom in thickness.

The present invention is not limited to the above-described wavelength converting device. Some modifications are possible. For example, instead of the KTN membrane 2, $KTaNbRbO_3$ membrane may be used. In this case, since the lattice constant of rubidium (Rb) is between the lattice constant of the KN membrane 3 and that of the substrate 1, the influence of the mismatch of the lattice constants between the substrate 1 and the KN membrane 3 on the KN membrane 3 can be sufficiently eased.

Furthermore, instead of the KTN membrane 2, $KTaNbCsO_3$ membrane may be used.

Moreover, in the above-described wavelength converting device, the thickness of the KTN membrane 2 is 500 angstrom. This is not limited. For the purpose of minimizing the size of the device, it is preferable that this thickness is thin. However, for the purpose of the reduction of the deformation in the KN membrane 3, it is preferable that this thickness is within the range of 300 to 500 angstrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-92398 filed on Mar. 20, 1998 including the specification, claims, drawings and summary is incorporated herein by reference in its entirety.

What is claimed is:

1. A wavelength converting device for converting a wavelength of a light comprising:

a substrate comprising MgO;

a waveguide membrane comprising $KNbO_3$, for guiding the light;

a buffer membrane which is disposed between the substrate and the waveguide membrane and which comprises $KTa_xNb_{(1-x)}O_3$, wherein a mixing rate of Ta in the $KTa_xNb_{(1-x)}O_3$ in the buffer membrane is in a range of 40 atom % to 60 atom % at a surface of the buffer membrane touching the substrate, and is 0 atom % at a surface of the buffer membrane touching the waveguide membrane.

2. The device according to claim 1, wherein a mixing rate of Ta in the $KTa_xNb_{(1-x)}O_3$ in the buffer membrane is gradually varied between a surface of the buffer membrane touching the substrate and a surface of the buffer membrane touching the waveguide membrane.

3. The device according to claim 1, the waveguide membrane has a surface including a (001) plane in $KNbO_3$ crystal.

4. The device according to claim 1, wherein the buffer membrane is in a range of 300 angstrom to 500 angstrom in thickness.

5. A method of fabricating a wavelength converting device for converting a wavelength of a light, the wavelength converting device comprising: a substrate comprising MgO; a waveguide membrane comprising $KNbO_3$, for guiding the light; a buffer membrane which is disposed between the substrate and the waveguide membrane and which comprises $KTa_xNb_{(1-x)}O_3$, a mixing rate of Ta in the $KTa_xNb_{(1-x)}O_3$ in the buffer membrane being in a range of 40 atom % to 60 atom % at a surface of the buffer membrane touching the substrate and being 0 atom % at a surface of the buffer membrane touching the waveguide membrane, the method comprising the steps of:

preparing the substrate;

forming the buffer membrane on the substrate by inducing crystal growth; and forming the waveguide membrane on the formed buffer membrane by inducing crystal growth.

6. The method according to claim 5, wherein the buffer membrane whose mixing rate of Ta is gradually varied between a surface of the buffer membrane on a side of the substrate and a surface of the buffer membrane on a side of the waveguide membrane is formed in the process of forming the buffer membrane.

7. The method according to claim 5, wherein the waveguide membrane having a surface including a (001) plane in $KNbO_3$ crystal is grown in the process of forming the waveguide membrane.

8. The method according to claim 5, wherein the buffer membrane whose thickness is in a range of 300 angstrom to 500 angstrom is formed in the process of forming the buffer membrane.

* * * * *